A. J. LEWIS.
METHOD OF ASSEMBLING SPRINGS IN FASTENER MEMBERS.
APPLICATION FILED MAY 31, 1919.

1,357,172. Patented Oct. 26, 1920.

INVENTOR
Arthur J. Lewis
BY
A. M. Wooster
ATTORNEY

UNITED STATES PATENT OFFICE.

ARTHUR J. LEWIS, OF STRATFORD, CONNECTICUT.

METHOD OF ASSEMBLING SPRINGS IN FASTENER MEMBERS.

1,357,172.  Specification of Letters Patent.  Patented Oct. 26, 1920.

Application filed May 31, 1919. Serial No. 301,011.

*To all whom it may concern:*

Be it known that I, ARTHUR J. LEWIS, a citizen of the United States, residing at Stratford, county of Fairfield, State of Connecticut, have invented an Improvement in Methods of Assembling Springs in Fastener Members, of which the following is a specification.

This invention relates to the manufacture of the socket members of snap fasteners, so called, the socket members of which are provided with wire springs of peculiar formation which lock the shanks of the other fastener members in engagement with said socket members.

In Letters Patent No. 1,305,132, granted to me May 27, 1919, is disclosed an improved method of forming the wire springs employed in snap fastener socket members of the type above referred to, and for inserting said springs into said socket members, and the present invention relates particularly to improvements in the latter step of the process, namely, that of assembling the springs in the fastener members.

The more particular objects of the invention will best be understood from the following explanation of one mode of carrying the same into effect, reference being had to the accompanying drawings in which.

Figure 7:
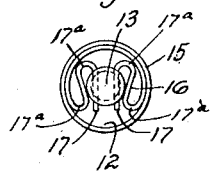
Fig. 7 is an enlarged plan view of the complete fastener member.

While the method constituting the present invention may be employed in inserting springs into other small spring receiving articles, the same has more particular reference to the introduction of springs into snap fastener socket members of the type shown in Fig. 7. A socket member of this type comprises a sheet metal disk 12 having a central hollow stud 13 constituting the socket proper and provided with diametrically opposite slots 14, said disk having an upwardly turned peripheral edge portion or flange 15 inclosing a wire spring 16, it being understood that, after the insertion of said spring, the edge 15 may be bent downwardly thereover to retain the same in place. The spring 16 is of a roughly semi-circular form, having an outer coil $16^a$ engaging the edge 15 of the fastener member, the ends of said coil being bent inwardly and outwardly upon themselves to form a series of convolutions $17^a$, and the free terminals 17 thereof being, in the completed fastener, adapted to enter laterally the slots 14 of the central stud 13.

Figure 2:
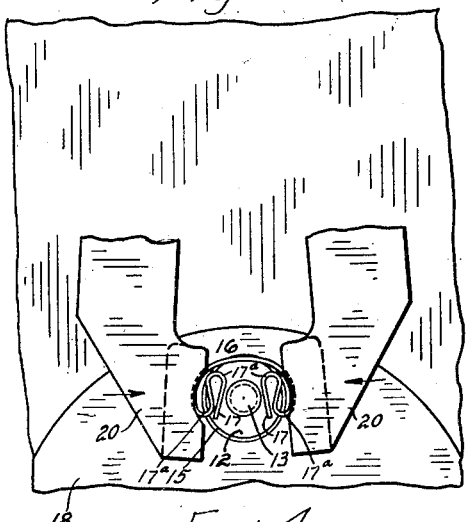

As disclosed and claimed in my copending application filed May 31, 1919, Serial No. 301,014, the springs 16 are preferably initially formed with their outer coils $16^a$ somewhat flatter than the form assumed when the spring is in its final position in the fastener member, the spring as a whole being consequently of a slightly elliptical form with a major diameter somewhat exceeding the diameter of the fastener member into which it is to be inserted, as will be clear from a comparison of Figs. 2 and 7, so that the expanded spring must be compressed sligthly when the same is inserted into the fastener, such spring being thereafter retained in the device under a permanent resilient compression which not only serves to resist accidental dislodgment of the spring from the fastener member, but increases the effective strength and resilience of the terminals 17, causing them to perform their intended function with increased reliability.

It will be observed that, in order to insert a spring of the form shown into a socket member of the character under consideration, it is necessary to compress the terminals 17 in order to permit the same to pass over the central stud 13 and snap into place in the slots 14. It therefore follows that said terminals 17, as also the several convolutions $17^a$, must, during the insertion of the spring, pass through the somewhat restricted annular space 22 between the central stud 13 and the peripheral edge 15. It will also be noted that when the spring is inserted the outer coil thereof must be confined within the peripheral edge of the socket member, and where an over-size spring is employed the outer coil thereof must be compressed inwardly to within the compass of the socket member. If the inward compression of the outer coil of the spring and the outward compression of the terminals 17 thereof take place simultaneously, and the entire spring is crowded at once into the restricted annular space 22, it will be seen that the convolutions $17^a$ will be subjected to a considerable strain which may be so excessive as to result in a permanent set, materially impairing the efficiency of the device. In order to avoid this difficulty, and in accordance with the present invention, the spring as a whole is not forced into the socket member all at once, but the terminals 17 are preferably first inserted into the fastener member and about the stud 13; the outer coil 16ª being at this time fully expanded or only slightly compressed, and thereafter the outer coil is compressed and forced into place in engagement with the peripheral edge 15 of the fastener, the terminals 17 being at this time free to expand downwardly into the fastener and laterally into the slots 14. In this manner it will be seen that the insertion of the several parts of the spring may be caused to take place successively instead of simultaneously, thereby avoiding excessive strain upon the spring.

Figure 1:
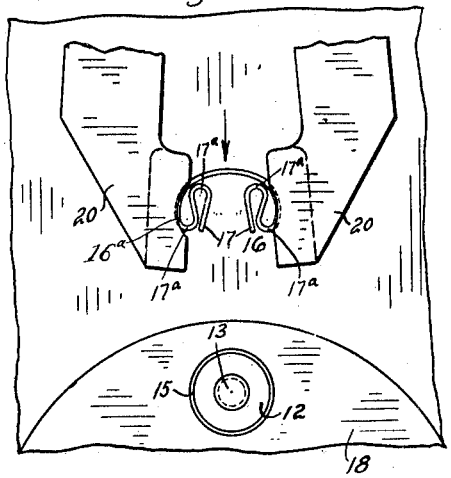
Figures 1 and 2 are diagrammatic plan views.
Figure 3:
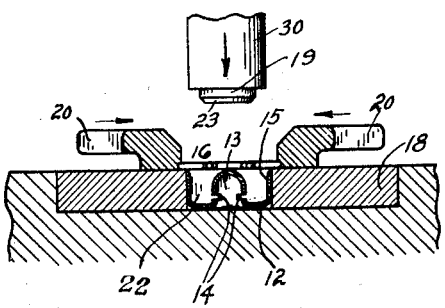
Figs. 3, 4, 5, and 6 are sectional views, illustrating different steps in the process of inserting a spring into a fastener member.
Figure 4:
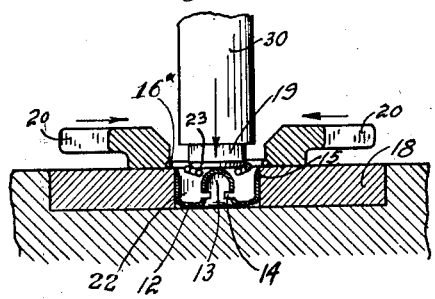
Figure 5:
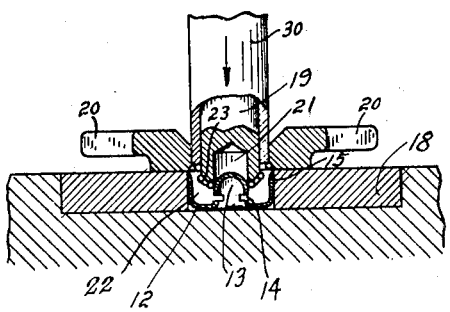
Figure 6:
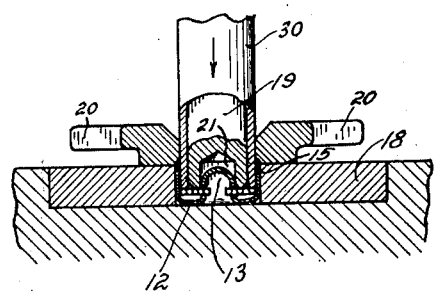

The foregoing operations may conveniently be performed as follows: The fastener member 12, into which a spring is to be inserted, is held in any suitable work-holding device, as, for example, a bed or carrier plate 18 having a recess to receive said fastener. The spring 16, in expanded condition, is held between a pair of suitably formed plier or other jaws 20 (which jaws may be either mechanically or manually operated), as shown in Fig. 1, and said jaws moved in the direction of the arrow on Fig. 1 to bring said spring immediately over the fastener member 12, as shown in Figs. 2 and 3. It will be observed that with the spring in its expanded form shown, the terminals 17 are separated a distance substantially equal to the diameter of the stud 13 and may therefore be readily forced downwardly at opposite sides of said stud. This operation may conveniently be performed by means of a suitable implement 19 having a recessed lower end 21 to fit over the central stud 13, said implement being moved downwardly between the jaws 20, as shown in Figs. 3 and 4. Coincident with or closely following the descent of the implement 19, the jaws 20 may be moved toward one another to compress the outer coil 16ª of the spring, as indicated by the arrows on Figs. 3 and 4. The end of the implement 19 is preferably beveled, as indicated at 23, so that, as said implement forces the terminals 17 and convolutions 17ª downwardly, said convolutions will assume the inclined position shown in Figs. 4 and 5. The compression of the outer coil 16ª, therefore, will not result in crowding the parts between the studs 13 and flange 15, but will tend to assist in forcing the terminals 17 downwardly about the stud 13 and into position to enter the slots 14. When the jaws 20 have compressed the outer coil 16ª into a sufficiently small compass to be received within the flanges 15, said outer coil may be forced downwardly into the socket member, this operation being permitted without undue strain upon the spring by the expansion of the terminals 17 into the slots 14. The operation last referred to, may be conveniently performed by means of an annular tool or implement 30 of an interior diameter corresponding, approximately, to the exterior diameter of the implement 19 and of an exterior diameter approximately equal to the inside diameter of the flange 15, said tool being movable downwardly over the implement 19, as indicated by the arrow on Fig. 5, and between the jaws 20, to force the spring downwardly from said jaws and into the socket member, as shown in Fig. 6, without permitting expansion of said spring until it is substantially in place.

Having thus described my invention, I claim:

1. The herein described method of applying springs having inner and outer portions to spring receiving articles having central studs, which consists in holding an expanded spring over an article to receive it, forcing the inner portion of said spring into said article and about the stud thereof, compressing the outer portion of said spring, and thereafter forcing said compressed outer portion into said article.

2. The herein described method of applying springs having inner and outer portions to spring receiving articles having central studs, which consists in providing a spring of an initially greater dimension than the corresponding dimension of the article to receive it, holding said spring immediately over said article, forcing the inner portion of said spring into said article and about the stud thereof, compressing the outer portion of said spring to within the compass of said article, and thereafter forcing said compressed outer portion into said article.

3. The herein described method of applying springs having inner and outer portions to spring receiving articles having outer edge portions coöperating with the outer portions of said springs and central studs coöperating with the inner portions of said springs, which consists in holding a spring over an article to receive it, forcing the inner portion of said spring into its operative position with respect to the stud of said article, and thereafter forcing the outer portion of said spring into said article and into its operative position with respect to the outer edge portion of said article.

4. The herein described method of inserting springs into spring receiving articles having central studs, which consists in holding an expanded spring over an article to receive it, forcing the inner portion of said spring into said article about the stud thereof, compressing said spring, and thereafter forcing the outer portion thereof into said article.

5. The herein described method of applying springs having outer coils and free inner terminals to spring receiving articles having outer edge portions coöperating with the outer coils of said springs and central studs having slots to receive the inner terminals of said springs, which consists in holding a spring over an article to receive it, forcing the inner terminals of said spring into said article and into position to enter said slots, and thereafter forcing the outer coil of said spring into its operative position with respect to the outer edge portion of said article.

6. The herein described method of applying springs having outer coils and free inner terminals to spring receiving articles having outer edge portions coöperating with the outer coils of said springs and central studs having slots to receive the inner terminals of said springs, which consists in providing a spring of initially greater diameter than the diameter of the article to receive it, placing said spring immediately over said article, forcing the inner terminals of said spring into said article and into positions to enter said slots, compressing the outer coil of said spring to a diameter substantially corresponding to the diameter of said article, and thereafter forcing said outer coil into its operative position with respect to the outer edge of said article.

7. The herein described method of applying springs having outer coils and free inner terminals to spring receiving articles having central studs coöperating with said terminals, which consists in holding a spring over an article to receive it with its terminals spaced apart a distance substantially equal to the diameter of the stud of said article and forcing said terminals into said article on opposite sides of said stud without decreasing the spacing of said terminals until said terminals are in place.

8. The herein described method of applying springs having outer coils and free inner terminals to spring receiving articles having outer edge portions coöperating with the outer coils of said springs and central studs coöperating with the inner terminals of said springs, which consists in providing a spring having an outer coil of initially greater diameter than the diameter of the article to receive it and having its terminals spaced apart a distance substantially equal to the diameter of the stud of said article, placing said spring immediately over said article, forcing said terminals into said article on opposite sides of said stud without decreasing the spacing of said terminals until said terminals are in place, compressing the outer coil of said spring to a diameter substantially corresponding to the diameter of the article, and thereafter forcing said outer coil into its operative position with respect to the outer edge of said article.

In testimony whereof I affix my signature.

ARTHUR J. LEWIS.